United States Patent
Dharawat

(10) Patent No.: US 9,697,368 B2
(45) Date of Patent: Jul. 4, 2017

(54) REGULATING COMMUNICATION OF AUDIO DATA FROM A CLIENT DEVICE BASED ON A PRIVACY SETTING STORED BY THE CLIENT DEVICE

(71) Applicant: Google Technology Holdings LLC, Mountain View, CA (US)

(72) Inventor: Parikshit Dharawat, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/445,133

(22) Filed: Jul. 29, 2014

(65) Prior Publication Data
US 2016/0036815 A1    Feb. 4, 2016

(51) Int. Cl.
*H04L 29/06* (2006.01)
*G06F 21/60* (2013.01)
*G06F 21/62* (2013.01)

(52) U.S. Cl.
CPC .......... *G06F 21/604* (2013.01); *G06F 21/606* (2013.01); *G06F 21/6254* (2013.01); *H04L 63/102* (2013.01)

(58) Field of Classification Search
CPC .... G06Q 10/1053; G06Q 50/01; G06Q 10/10; G06F 21/62; G06F 21/51; G06F 21/575; G06F 21/78; G06F 2221/2129; G06F 2221/2153; G06F 21/604; G06F 21/6254; G06F 21/606; H04L 63/102
See application file for complete search history.

(56) References Cited

U.S. PATENT DOCUMENTS

| | | | |
|---|---|---|---|
| 7,844,460 B2 | 11/2010 | Charlier et al. | |
| 8,396,711 B2 | 3/2013 | Yee et al. | |
| 8,612,891 B2 | 12/2013 | Singh et al. | |
| 2008/0302867 A1* | 12/2008 | Holberg | 235/375 |
| 2012/0174236 A1* | 7/2012 | Goodwin | H04L 63/102 726/27 |
| 2012/0185547 A1* | 7/2012 | Hugg | H04L 51/20 709/206 |
| 2012/0289277 A1* | 11/2012 | Ahmed | H04W 76/005 455/518 |
| 2013/0014284 A1* | 1/2013 | Vernal | G06F 21/6245 726/28 |
| 2013/0054701 A1* | 2/2013 | Leeder et al. | 709/205 |
| 2013/0247151 A1* | 9/2013 | Barrett-Bowen | H04L 63/104 726/4 |
| 2013/0282605 A1* | 10/2013 | Noelting | 705/321 |
| 2014/0108935 A1* | 4/2014 | Yuen et al. | 715/728 |

(Continued)

*Primary Examiner* — Don Zhao
(74) *Attorney, Agent, or Firm* — Faegre Baker Daniels LLP

(57) ABSTRACT

A client device stores a user-specified privacy setting regulating communication of information associated with audio data captured by the client device to an external entity. When the client device captures audio data, the client device determines whether the user-specified privacy setting authorizes communication of data associated with the captured audio data to an external entity. The privacy setting may identify specific external entities to which data may be communicated, specify characteristics of captured audio data authorized to be transmitted, or generally specify whether communication of data associated with captured audio data is authorized or prevented.

19 Claims, 3 Drawing Sheets

(56) References Cited

U.S. PATENT DOCUMENTS

| | | | |
|---|---|---|---|
| 2014/0114738 A1* | 4/2014 | Tseng et al. | 705/14.27 |
| 2014/0129226 A1* | 5/2014 | Lee | G10L 15/04 |
| | | | 704/254 |
| 2014/0214895 A1* | 7/2014 | Higgins | G06F 17/30646 |
| | | | 707/770 |
| 2014/0222912 A1* | 8/2014 | St. Clair | 709/204 |
| 2014/0287723 A1* | 9/2014 | LaFever | H04W 12/02 |
| | | | 455/411 |
| 2015/0243287 A1* | 8/2015 | Nakano | G10L 15/30 |
| | | | 704/246 |

\* cited by examiner

REGULATING COMMUNICATION OF AUDIO DATA FROM A CLIENT DEVICE BASED ON A PRIVACY SETTING STORED BY THE CLIENT DEVICE

BACKGROUND

This disclosure generally relates to communication of audio data from a client device, and more specifically to regulating communication of audio data from the client device.

Increasingly, users exchange data with each other using client devices, such as mobile telephones. For example, client devices establish a connection with each other through which users associated with the client devices exchange voice data or other audio data. Additionally, audio data captured by client devices may be communicated to a content server, which analyzes the received audio data and determines contextual information associated with the audio data.

For example, multiple client devices may establish connections with each other and exchange audio data, allowing users associated with various client devices to participate in a conference call. Audio data captured by various client devices is communicated to a content server, which analyzes audio data from different client devices to determine contextual information or other data associated with the audio data. Conventional methods for communicating audio data to a content server communicate information from each client device exchanging audio data. However, users of various client devices may have different privacy preferences for communicating audio data captured by associated client devices to a content server. Conventional methods for communicating audio data to a content server to not allow users associated with different client devices to enforce different settings for communicating audio data to a content server.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A client device stores a user-specified privacy setting regulating communication of information associated with audio data captured by the client device to an external entity. For example, the user-specified privacy setting authorizes or prevents communication of data associated with audio data captured by the client device to a local data processing module for determining contextual information associated with the audio data. In some embodiments, the user provides authentication information along with the privacy setting to confirm that the user is associated with the client device. The captured audio data may be voice data captured from a user associated with the client device.

When the client device captures audio data, the client device determines whether the user-specified privacy setting authorizes communication of data associated with the captured audio data to an external entity. The privacy setting may identify specific external entities to which data may be communicated, specify characteristics of captured audio data authorized to be transmitted, or generally specify whether communication of data associated with captured audio data is authorized or prevented. For example, a privacy setting has a value authorizing communication of captured audio data to external entities or a value preventing communication of captured voice data to external entities. In other examples, a privacy setting authorizes communication of captured audio data to a set of one or more external entities associated with the privacy setting or prevents communication of captured audio data to the set of one or more external entities associated with the privacy setting. If the privacy setting authorizes communication of data associated with captured audio data to an external entity, the client device communicates data associated with the captured audio data to the external entity. However, if the privacy setting prevents communication of data associated with the captured audio data to the external entity, the client device does not communicate the data associated with the captured audio data to the external entity.

System Architecture

Figure 1:
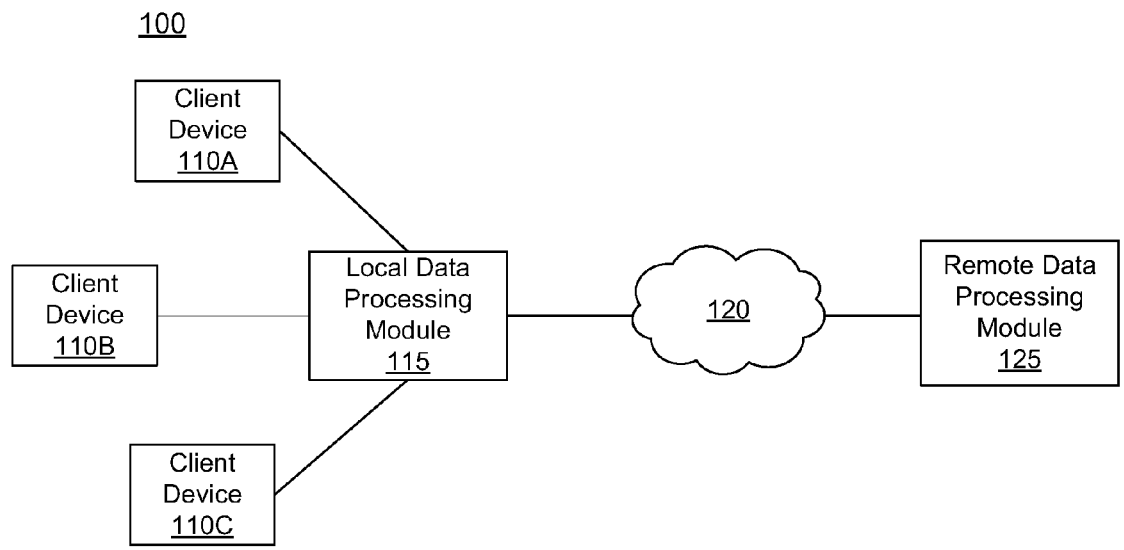
FIG. 1 is a block diagram of a system environment, in accordance with an embodiment.

FIG. 1 is a block diagram of a system environment 100 including multiple client devices 110A, 110B, 110C (also referred to individually and collectively using reference number 110), a local data processing module 115, a network 120, and a remote data processing module 125. In various embodiments, any number of client devices 110 are included in the system environment 100. Additionally, in alternative configurations, different and/or additional components may be included in the system environment 100.

A client device 110 is one or more computing devices capable of receiving user input as well as transmitting and/or receiving data via the network 120. In one embodiment, the client device 110 is a computer system, such as a desktop or a laptop computer. Alternatively, the client device 110 is any device with computing functionality, such as a personal digital assistant (PDA), a mobile telephone, a smartphone, a tablet computer or another suitable device. Each client device 110 may be associated with a user. For example, a client device 110 includes data identifying a user authorized to access the client device 110, limiting access to the client device 110 to the user providing identifying information matching the included data. A client device 110 may include instructions for executing one or more applications that modify data or exchange data with a content source (e.g., an application provider, a content provider, etc.). For example, the client device 110 executes a browser that receives content from a content source and presents the content to a user of the client device 110. In another embodiment, the client device 110 interacts with a content source through an application programming interface (API) running on a native operating system of the client device 110, such as IOS® or ANDROID™ An example client device 110 is further described below in conjunction with FIG. 2. While FIG. 1 shows three client devices 110A, 110B, 110C, in various embodiments, any number of client devices 110 may be included in the system environment 100.

The client devices 110 are coupled to a local content processing module 115, which is a computing device that receives information from one or more client devices 110. For example, the local content processing module 115 receives audio data captured by one or more of the client devices 110 and generates data from the received audio data. The client devices 110 and the local content processing module 115 may be included in a common physical location, such as a building or room within a building. Audio data is communicated from a client device 110 to the local content processing module 115 based on one or more privacy settings stored by the client device 110 regulating access to audio data captured by the client device 110. If a client device 110 includes a privacy setting specified by a user associated with the client device 110 that authorizes communication of captured audio data from the client device 110 to the local content processing module 115, the client device 110 communicates captured audio data to the local content processing module 115. However, if the client device 110 includes a user-specified privacy setting preventing communication of captured audio data from the client device 110 to the local content processing module 115, the client device 110 does not communicate captured audio data to the local content processing module 115. This allows a user of a client device 110 to regulate communication of audio data captured by a client device 110 to the local content processing module 115. While FIG. 1 shows an example system environment 100 including a single local processing module 115, in other embodiments, the system environment 100 may include any number of local processing modules 115.

In some embodiments, the local content processing module 115 processes audio data received from a client device 110 to generate data describing one or more characteristics of the audio data. For example, the local content processing module 115 identifies words or phrases from the audio data or identifies characteristics of the audio data. Data generated by the local content processing module 115 is communicated to the remote content processing module 125 via the network. Alternatively, the local content processing module 115 communicates audio data received from a client device 110 to the remote content processing module 125 without processing the audio data.

The client devices 110A, 110B, 110C, the local content processing module 115, and the remote content processing module 125 communicate with each other via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In one embodiment, the remote data processing module 125 generates contextual data based on audio data or information describing audio data received from the local content processing module 115. The contextual data includes information describing characteristics of the audio data received from one or more client devices 110. For example, the remote data processing module 125 receives audio data captured by multiple client devices 110A, 110B 110C participating in a conference call and generates information describing the conference call or characteristics of the conference call from the received audio data. In some embodiments, the local content processing module 115 communicates audio data, information identifying a client device 110 from which the audio data was received, and information identifying a conversation involving the client device 110 (e.g., identifiers of additional client devices 110 involved in the conversation) to the remote data processing module 125.

The contextual information generated by the remote data processing module 125 may include additional information about one or more topics identified from the audio data, information about one or more users associated with audio data, or any other suitable information. Contextual information is communicated from the remote data processing module 125 to the local data processing module 115, which may communicate the contextual information to one or more client devices 110. For example, the contextual information identifies one or more client devices 110 associated with the contextual information (e.g., client devices 110 associated with users participating in a conversation), and the local data processing module 115 communicates the contextual information to each identified client device 110 or to a subset of the identified client devices 110. As another example, audio data captured by one or more client devices 110 and received by the local data processing module 115 is communicated to the remote data processing module 125, which analyzes the captured audio data to determine contextual information about one or more topics identified from the audio data; in this example, the contextual information determined by the remote data processing module 125 changes as the content of the received audio data changes.

Figure 2:
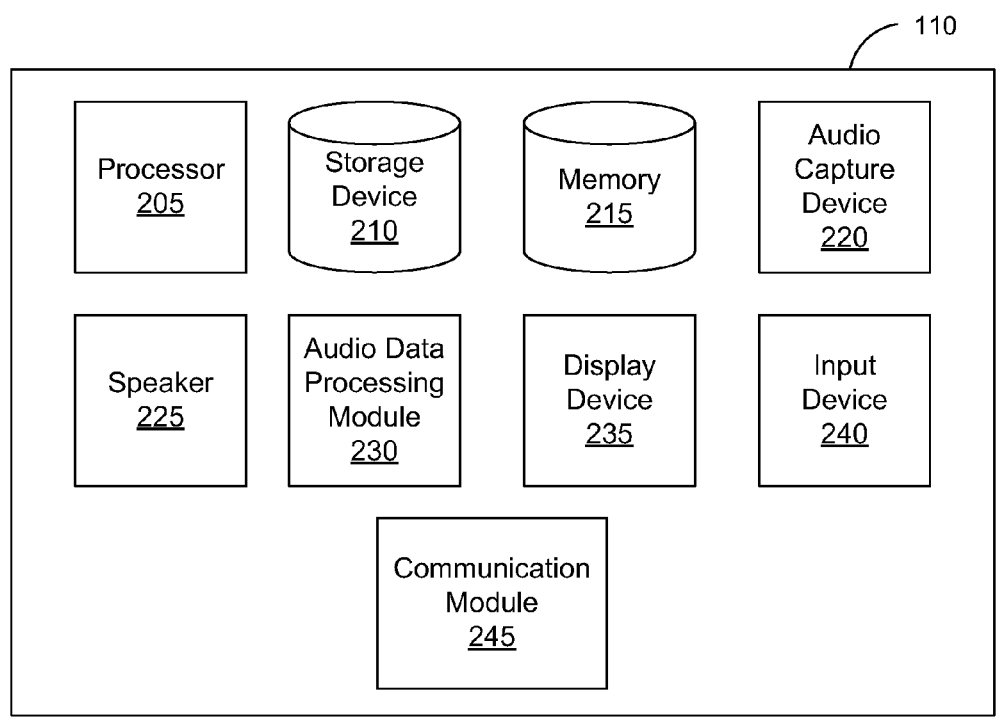
FIG. 2 is a block diagram of a client device, in accordance with an embodiment.

FIG. 2 is a block diagram of one embodiment of a client device 110. In the example shown by FIG. 2, the client device 110 includes a processor 205, a storage device 210, a memory 215, an audio capture device 220, a speaker 225, an audio data processing module 230, a display device 235, an input device 240, and a communication module 245. However, in other embodiments, the client device 110 may include different and/or additional components than those described in conjunction with FIG. 2.

The client device 110 includes one or more processors 205, which retrieve and execute instructions from the storage device 210 or the memory 215. Additionally, a processor 205 receives information from the input device 230 and executes one or more instructions included in the received information. The storage device 210 is a persistent storage device including data and/or instructions for execution by the processor 205 or for presentation to a user of the client device. Examples of a storage device 210 include a solid-state drive, a flash memory drive, a hard drive, or other suitable persistent storage device.

The memory 215 stores instructions for execution by one or more processor 205. In various embodiments, the memory 215 is a volatile storage medium, while the storage device 210 is a non-volatile storage medium. Examples of a volatile storage medium include random access memory (RAM), static random access memory (SRAM), and dynamic random access memory (DRAM). Storing data or instructions in the memory 215 allows a processor 205 to retrieve the data or instructions more rapidly than data or instructions stored in the storage device 210. The data or instructions included in the memory 215 may be modified at various time intervals or in response to data received from a processor 205.

In one embodiment, the memory 215 is partitioned into a plurality of regions that are each associated with an identifier. For example, a slot represents a specified amount of the memory 215 and is associated with an address, allowing data stored in the slot to be retrieved using the address. Hence, different data may be stored in different slots and subsequently retrieved based on the identifiers associated with the slots.

The audio capture device 220 captures audio data and communicates the audio data to the processor 205, to the memory 215, or to any suitable component of the client device 110. For example, the audio capture device 220 comprises one or more microphones included in the client device 110. While FIG. 2 shows an example where the audio capture device 220 is included in the client device 110, in other embodiments, the audio capture device 220 may be external to the client device 110 and communicatively coupled to the client device 110. For example, the audio capture device 220 is a speaker and microphone system external to the client device 110 that exchanges information with the client device 110 via the network 120 or a connection to the client device 110.

The speaker 225 generates audio data based on information received or processed by the client device 110. For example, the client device 110 includes one or more speakers 225. While FIG. 2 shows an example where the speaker 225 is included in the client device 110, in other embodiments, the speaker 225 may be external to the client device 110 and communicatively coupled to the client device 110. For example, the speaker 225 is external to the client device 110 that exchanges information with the client device 110 via the network 120 or a connection to the client device 110. When the client device 110 receives audio data, the audio data is communicated to the external speaker 225.

The audio data processing module 230 processes audio data captured by the audio capture device 220. For example, the audio data processing module 230 filters one or more frequencies from captured audio data, applies one or more noise canceling algorithms, or otherwise processes the captured audio data. In some embodiments, the audio data processing module 230 extracts information from the captured audio data, such as words or phrases. Additionally, the audio data processing module 230 may associate data with the captured audio data. For example, the audio data processing module 230 associates a time and date with the captured audio data, associates a geographic location with the captured audio data, associates one or more user identifies with the captured audio data, or associates any other suitable information with the captured audio data.

Additionally, the audio data processing module 230 stores one or more privacy settings associated with a user of the client device 110 and specified by the user. Privacy settings allow the user to regulate access of other users or entities to audio data processed by the audio data processing module 230. However, a privacy setting does not affect communication of audio data between client devices 110 that have established a voice connection with each other. Rather, a privacy setting regulates use of audio data captured by the client device 110 for processing by one or more entities external to the client device 110 for determining contextual information captured by the client device 110. A privacy setting may have a value authorizing the audio data processing module 230 to communicate processed audio data to the local data processing module 115 or may have a value preventing the audio data processing module 230 from communicating the processed audio data to the local data processing module 115. In some embodiments, a privacy setting may limit communication of audio data to the local data processing module 115 to a subset of the captured audio data. For example, a privacy setting limits communication of audio data to the local data processing module 115 to audio data captured within a specified time interval or associated with one or more locations. Including one or more privacy settings in the audio data processing module 230 allows a user to limit communication of audio data from the client device 110 to the local data processing module 230. Use of one or more privacy settings to regulate communication of audio data is further described below in conjunction with FIG. 3.

A display device 235 presents content and other information to a user of the client device 110. Examples of the display device 235 include a liquid crystal display (LCD), an organic light emitting diode (OLED) display, an active matrix liquid crystal display (AMLCD), or any other suitable device. Different client devices 110 may have display devices 235 with different sizes, different resolutions, or other different characteristics.

For purposes of illustration, FIG. 2 shows a single input device 240; however, the client device 110 may include multiple input devices 240 in various embodiments. The input device 240 receives input from a user of the client device 110. Examples of the input device 240 include a touch-sensitive display, a keyboard, a dial pad, a mouse, and a trackpad. Using a touch-sensitive display allows the client device 110 to combine the display device 235 and the input device 240, simplifying user interaction with presented content. Inputs received via the input device 240 are be processed by the processor 205 and may be communicated to a content source, to the local data processing module 115, to the remote data processing module 125, or to another client device 110 via the communication module 245.

The communication module 245 transmits data from the client device 110, to the local data processing module 115, to the remote data processing module 125, or to another client device 110 via the network 120. Additionally, the communication module 245 receives data via the network 120 (e.g., data from another client device 110 or from the local data processing module 115) and communicates the received data to one or more components of the client device 110. For example, the communication module 245 is a wireless transceiver configured to transmit data using one or more wireless communication protocols. Example wireless communication protocols include: Global System of Mobile (GSM), Code Division, Multiple Access (CDMA), General Packet Radio Service (GPRS), third-generation (3G) mobile, fourth-generation mobile (4G), High Speed Download Packet Access (HSDPA), High Speed Uplink Packet Access (HSUPA), Long-Term Evolution (LTE) and Worldwide Interoperability for Microwave Access (WiMAX). In some embodiment, the communication module 245 enables connection to the network 120 through a wired communication protocol, such as Ethernet. While FIG. 2 shows a single communication module 245, multiple communication modules 245 may be included in a client device 110 in some embodiments.

Transmitting Audio Data Subject to User-Specified Privacy Settings

Figure 3:
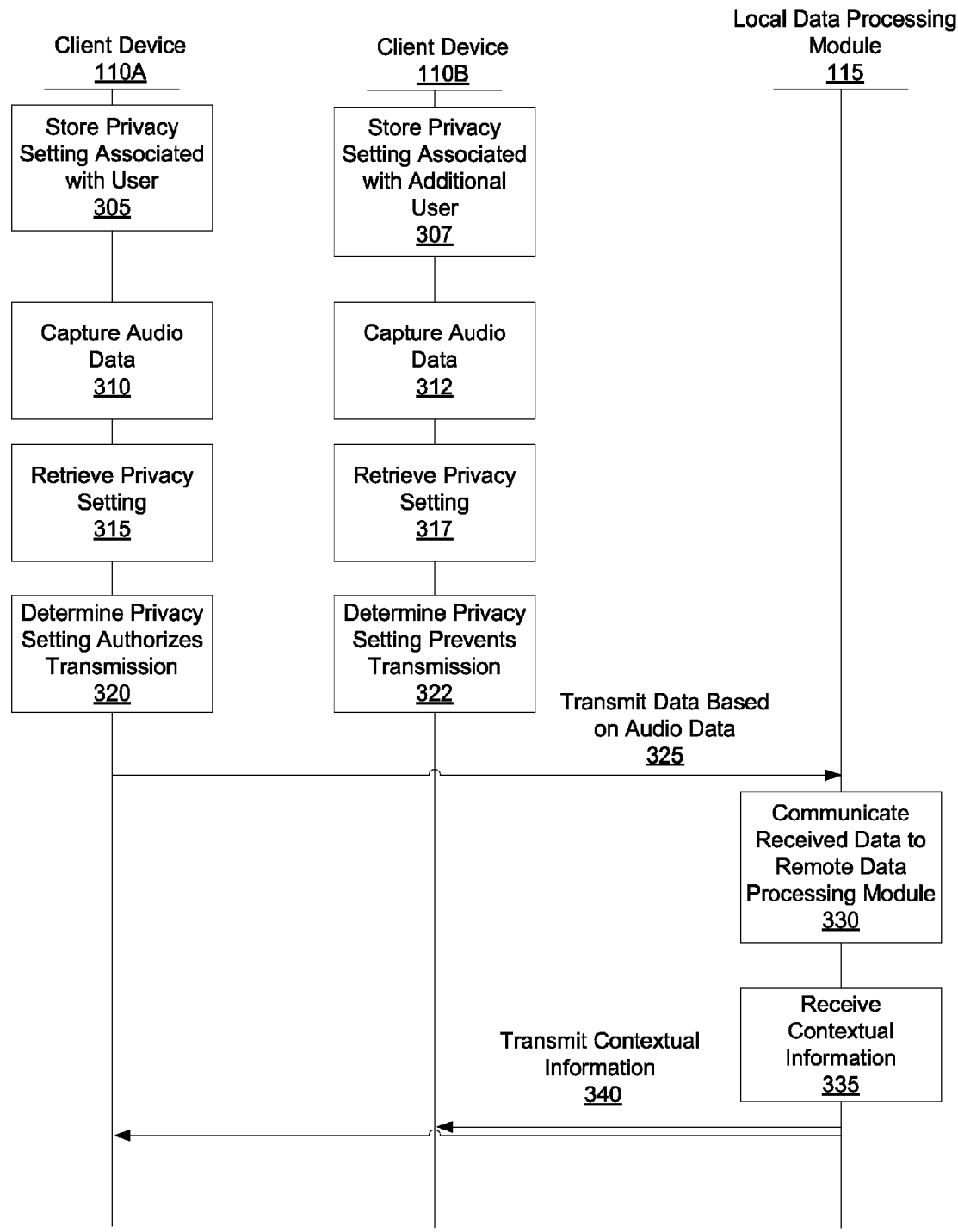
FIG. 3 is an interaction diagram of a method for communicating data from client devices subject to privacy settings stored by the client devices, in accordance with an embodiment.

FIG. 3 is an interaction diagram of a method for communicating audio data from client devices 110A, 110B based on privacy settings specified by a user associated with each client device 110A, 110B. While FIG. 3 shows an example involving two client devices 110A, 110B, in other embodiments, any number of client devices 110 may be involved. Additionally, in the example of FIG. 3 data is communicated from client devices 110A, 110B to a local data processing module 115; however, in alternative embodiments, data may be communicated from client devices 110A, 110B to a remote data processing module 125. Additionally, other embodiments may include different or additional steps than those shown in FIG. 3.

Client device 110A stores 305 a privacy setting associated with a user associated with client device 110A. The privacy setting stored 305 by client device 110A is specified by the user associated with client device 110A. In some embodiments, the privacy setting is stored 305 by client device 110A in response to an input by the user with the client device 110A or with a speaker or microphone coupled to the client device 110A. For example, the user contacts an input device of a microphone coupled to the client device 110A or contacts an input device 240 of the client device 110A to specify a first value of the privacy setting and does not contact an input device of the microphone or of the client device 110A to specify an alternative value of the privacy setting. Similarly, client device 110B stores 307 a privacy setting associated with an additional user associated with client device 110B and specified by the additional user. As described above in conjunction with FIG. 2, the privacy setting is specified by a user and determines whether audio data captured by a client device 110 associated with the user is authorized to communicate the captured audio data to an additional entity, such as the local data processing module 115. In the example of FIG. 3, client device 110A stores 305 a privacy setting authorizing communication of audio data, while client device 110B stored 307 a privacy setting preventing communication of audio data. While FIG. 3 shows an embodiment where client devices 110A, 110B store privacy settings associated with users, in other embodiments, the privacy settings may be stored 305, 307 in one or more locations external to client devices 110A, 110B.

After storing 305 the privacy setting, client device 110A captures 310 audio data, such as audio data from the user associated with client device 110A. Similarly, client device 110B captures 312 audio data, such as audio data from the user associated with client device 110B. For example, client device 110A and client device 110B establish a connection with each other and communicate captured audio data to each other. In one embodiment, client device 110A and client device 110B establish a connection, allowing the user and the additional user to exchange voice information via the connection.

While client device 110A captures 310 audio data, client device 110A retrieves 315 the stored privacy setting associated with the user. Similarly, client device 110B retrieves 317 the stored privacy setting associated with the additional user as client device 110B captures 312 audio data. The stored privacy setting determines whether a client device 110 is authorized to communicate audio data captured by the client device 110 to an external entity, such as the local data processing module 115 or the remote data processing module 125. A stored privacy setting may identify one or more entities to which the client device 110 is authorized to communicate data or may identify characteristics of captured audio data authorized to be transmitted to an external entity.

In the example of FIG. 3, client device 110A determines 320 the stored privacy setting authorizes transmission of the captured audio data to the local data processing module 115, so client device 110A transmits 325 data based on the audio data to the local data processing module 115. As an example, the privacy setting stored 305 by client device 110A identifies entities to which client device 110A is authorized to communicate audio data. In this example, client device 110A compares an identifier associated with the local data processing module 115 to an identifier specified by the stored privacy setting. If the identified associated with the local data processing module 115 matches the identifier specified by the stored privacy setting, client device 110A transmits 325 data based on audio data to the local data processing module 115. However, in other embodiments, the stored privacy setting identifies entities to which client device 110 is not authorized to communicate audio data. In these embodiments, if the identifier associated with the local data processing module 115 does not match the identifier specified by the stored privacy setting, client device 110A transmits data based on audio data to the local data processing module 115. As another example, the privacy setting stored 305 by client device 110A generally authorizes communication of audio data captured by client device 110A to various external entities. In some embodiments, one or more characteristics of the audio data captured 310 by client device 110A are compared to characteristics specified by the stored privacy setting, with the client device 110A transmitting 325 the audio data if its characteristics match at least a threshold number or percentage of characteristics specified by the stored privacy setting. This allows the user associated with client device 110A to limit transmission of audio data to audio data having specific characteristics. Alternatively, if characteristics associated with the captured audio data do not match at least a threshold number or percentage of characteristics associated with the stored audio data, client device 110A transmits 325 data associated with the captured audio data to the local data processing module 115.

Data based on the audio data transmitted 325 by client device 110A may be data generated from the audio data or may be the captured audio data. For example, client device 110A extracts words, phrases, location information, or any other suitable data and transmits 325 the extracted data to the local data processing module 115. Alternatively, client device 110A associates additional information with the captured audio data and transmits 325 the captured audio data and the additional information to the local data processing module 115. As another example, client device 110A transmits 325 the captured audio data to the local data processing module 115.

In the example of FIG. 2, client device 110B determines 322 the privacy setting stored 307 by client device 110B prevents transmission of the captured audio data from client device 110B to the local data processing module 115. In one embodiment, the privacy setting stored 307 by client device 110B is associated with identifiers of external entities to which the client device 110B is authorized by the user to communicate captured audio data; for example, client device 110B compares an identifier associated with the local data processing module 115 to an identifier associated with the stored privacy setting. If the identifier associated with the local data processing module 115 does not match the identifier specified by the stored privacy setting, client device 110B determines 322 it is prevented from transmitting the captured audio data. In an alternative embodiment, the stored privacy setting is associated with identifiers of external entities to which client device 110 is not authorized by the user to communicate captured audio data; in this embodiment, if the identifier associated with the local data processing module 115 matches the identifier specified by the stored privacy setting, client device 110B determines 322 it is prevented from transmitting the captured audio data, allowing the stored privacy setting to act as a blacklist. Additionally, client device 110B compares characteristics associated with the captured audio data to characteristics specified by the stored privacy setting. If the characteristics associated with the captured audio data do not match at least a threshold number or percentage characteristics associated with the stored privacy setting, client device 110B determines 322 transmission of the captured audio data is prevented. Alternatively, if characteristics associated with the captured audio data match at least a threshold number or percentage of characteristics associated with the stored audio data, client device 110B determines 322 transmission of the captured audio data is prevented.

The local data processing module 115 communicates 330 the received data to a remote content server 125, which generates contextual information based on the retrieved data. Contextual information generated by the remote data processing module 125 may include additional information about one or more topics identified from the audio data, information about one or more users associated with audio data, characteristics of the audio data, or any other suitable information. The local data processing module 115 subsequently receives 335 the contextual information from the remote data processing module 125 and transmits 340 the received contextual information to one or more of the client devices 110. In the example of FIG. 3, the local data processing module 115 transmits 340 the received contextual information to each client device 110A, 110B. However, in other embodiments, the local data processing module 115 transmits 340 the received contextual information to a subset of the client devices 110. For example, the received contextual information is transmitted to client devices 110 that authorized transmission of audio data to the local data processing module 115 or to client device 110 associated with identifiers specified by the contextual information.

Figure 4:
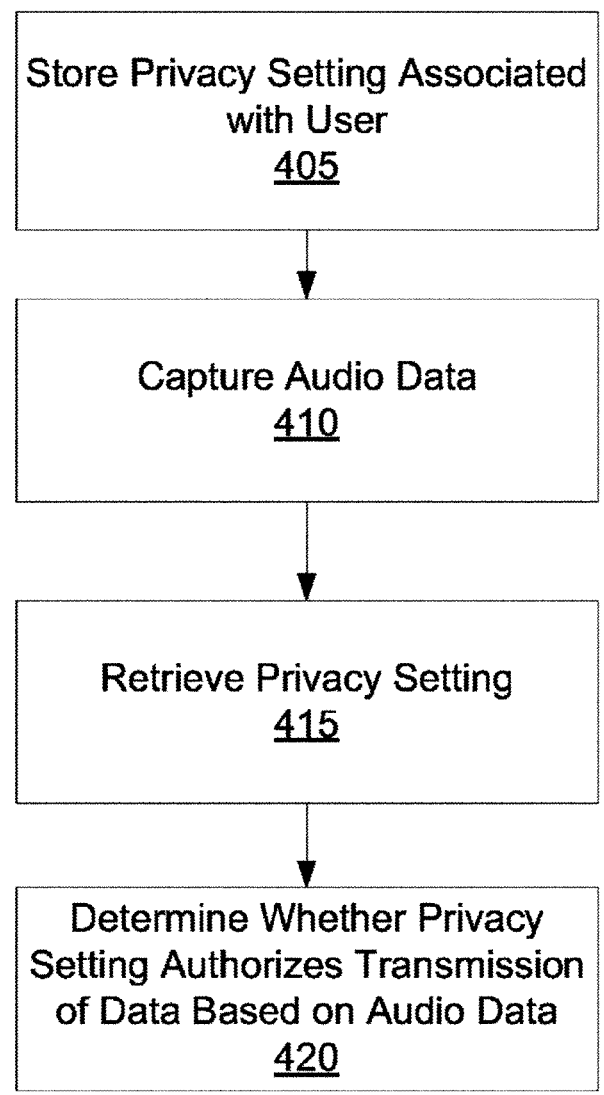
FIG. 4 is a flowchart of a method for communicating data from a client device based on a privacy setting stored by the client device, in accordance with an embodiment.

FIG. 4 is a flowchart of a method for communicating audio data from a client device 110 based on one or more privacy settings stored on the client device 110. In some embodiments, the steps described in conjunction with FIG. 4 may be performed in different orders than the order described in conjunction with FIG. 4. Additionally, other embodiments may include different or additional steps than those shown in FIG. 4

The client device 110 receives information from a user associated with the client device specifying a privacy setting and stores 405 the specified privacy setting. In some embodiments, the client device 110 stores 405 the specified privacy setting if the user provides information confirming that the user is associated with the client device 110. For example, the privacy setting is stored 405 if the user provides authentication information, such as a password or biometric data, verifying the user's identity to the client device 110. A stored privacy setting may identify one or more entities to which the client device 110 is authorized to communicate data or may identify characteristics of captured audio data authorized to be transmitted to an external entity. While FIG. 4 shows an example where the client device 110 stores 405 the privacy setting, in other embodiments, the privacy setting may be stored 405 in an entity external to the client device 110 and subsequently retrieved from the entity by the client device 110 as further described below.

After storing 405 the privacy setting, the client device 110 captures 410 audio data from the user. For example, the client device 110 captures 410 voice data received from the user. As the client device 110 captures 410 audio data, or after the client device 110 captures 410 a threshold amount of audio data, the client device 110 retrieves 415 the stored privacy setting. Based on the stored privacy setting, the client device 110 determines 420 whether transmission of the captured audio data to an external entity is authorized. For example, the client device 110 determines 420 whether the captured audio data is authorized to be transmitted to a local data processing module 115. In some embodiments, the client device 110 may determine 420 whether the captured authorized data is authorized to be transmitted to different external entities.

In one embodiment, the client device 110 compares an identifier associated with an external entity, such a local data processing module 115, to an identifier specified by the stored privacy setting. If the identified associated with the external matches the identified specified by the stored privacy setting, the client device 110 determines the data is authorized to be transmitted to the external entity and transmits data based on audio data to the external entity as described above in conjunction with FIG. 3. As another example, the stored privacy setting generally authorizes communication of audio data captured 410 by client device to various external entities; hence, if the privacy setting has a value authorizing communication of captured audio data, the client device 110 determines 420 captured audio data is authorized to be transmitted to an external entity. In some embodiments, one or more characteristics of the audio data captured 310 by client device are compared to characteristics specified by the stored privacy setting, with the client device 110 determining 420 it is authorized to transmit the audio data if the audio data's characteristics match at least a threshold number or percentage of characteristics specified by the stored privacy setting. For example, if location or timing information associated with the captured audio data satisfies location or timing information specified by the stored privacy setting, the client device 110 determines 420 it is authorized to transmit data based on the captured audio data. This allows the user associated with client device 110 to limit transmission of audio data to audio data having specific characteristics. Alternatively, if characteristics associated with the captured audio data do not match at least a threshold number or percentage of characteristics associated with the stored audio data, the client device 110 determines 420 it is authorized to transmit data associated with the captured audio data to an external entity.

Alternatively, the stored privacy setting acts as a blacklist by identifying external entities to which the client device 110 is prevented from transmitting data based on the captured audio data or specifying characteristics of audio data about which the client device 110 is prevented from transmitting data to an external entity. In one embodiment, if an identifier associated with an external entity does not match an identifier specified by the stored privacy setting, the client device 110 determines 420 it is authorized to transmit data based on audio data to the external entity. The client device 110 may compare characteristics associated with the captured audio data to characteristics specified by the stored privacy setting. If the characteristics associated with the captured audio data match at least a threshold number or percentage characteristics associated with the stored privacy setting, the client device 110 determines 420 data associated with the captured audio data is not authorized to be transmitted to an external entity. Alternatively, the privacy setting has a value preventing transmission of data associated with the captured audio data to an external entity, so the client device 110 determines 420 data associated with the capture data is not authorized to be transmitted if the privacy setting has the value.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
a first and a second client computing devices for voice communication, each of the first and the second client computing devices being associated with a respective user and configured to:
process captured audio data including voice data from the respective user being transmitted between the first and the second client computing devices;
store a respective privacy setting specified by the respective user; and
regulate communication of the captured audio data by transmitting the captured audio data to an external entity when the captured audio data is authorized for communication by the respective privacy setting, and not transmitting the captured audio data to the external entity when the captured audio data is not authorized for communication by the respective privacy setting; and
the external entity configured to receive information based at least in part on the captured audio data from the first and the second client computing devices and configured to communicate contextual information determined from the received information to the first and the second client computing devices.

2. The system of claim 1, wherein the external entity is further configured to communicate the contextual information to the first and the second client computing devices via another external entity.

3. The system of claim 1, wherein the respective privacy setting of the first and the second client computing devices is selected from a group consisting of a privacy setting authorizing communication of captured audio data and a privacy setting preventing communication of captured audio data.

4. The system of claim 1, wherein the respective privacy setting of the first and the second client computing devices is selected from a group consisting of a privacy setting authorizing communication of captured audio data, a privacy setting preventing communication of captured audio data, and a privacy setting authorizing communication of a subset of information based on captured audio data.

5. The system of claim 4, wherein the privacy setting authorizing communication of the subset of information based on captured audio data specifies one or more characteristics of captured audio data authorized to be communicated.

6. The system of claim 1, wherein the captured audio data from the first and the second client computing devices includes a location associated with the captured audio data.

7. A method comprising:
receiving, by a first client computing device, a privacy setting from a user associated with the first client computing device, the privacy setting regulating communication of audio data captured by the first client computing device to one or more external entities;
storing, by the first client computing device, the privacy setting in the first client computing device;
capturing, by the first client computing device, audio data including voice data from the user being transmitted to a second client computing device;
retrieving, by the first client computing device, the privacy setting;

determining, by the first client computing device, whether the first client computing device is authorized to communicate the captured audio data to an external entity based at least in part on the privacy setting;

not communicating, by the first client computing device, the captured audio data to the external entity when the privacy setting indicates that the communication to the external entity is not authorized; and communicating, by the first client computing device, the captured audio data to the external entity when the privacy setting indicates that the communication to the external entity is authorized.

8. The method of claim 7, wherein determining whether the first client computing device is authorized to communicate the captured audio data to the external entity based at least in part on the privacy setting comprises:

determining whether the privacy setting has a privacy setting value authorizing communication of the captured audio data or has a privacy setting value preventing communication of the captured audio data.

9. The method of claim 7, wherein determining whether the first client computing device is authorized to communicate the captured audio data to the external entity based at least in part on the privacy setting comprises:

comparing an identifier associated with the external entity to an identifier specified by the privacy setting, the identifier indicating an entity to which the first client computing device is authorized to communicate the captured audio data; and determining the first client computing device is authorized to communicate the captured audio data to the external entity if the identifier associated with the external entity matches the identifier specified by the privacy setting.

10. The method of claim 7, wherein determining whether the first client computing device is authorized to communicate the captured audio data to the external entity based at least in part on the privacy setting comprises:

comparing an identifier associated with the external entity to an identifier specified by the privacy setting, the identifier indicating an entity to which the first client computing device is not authorized to communicate the captured audio data; and determining the first client computing device is authorized to communicate the captured audio data to the external entity if the identifier associated with the external entity does not match the identifier specified by the privacy setting.

11. The method of claim 7, wherein determining whether the first client computing device is authorized to communicate the captured audio data to the external entity based at least in part on the privacy setting comprises:

retrieving one or more characteristics associated with the captured audio data;

determining whether the one or more characteristics associated with the captured audio data match at least a threshold amount of characteristics specified by the privacy setting, the at least the threshold amount of characteristics being used to authorize the first client computing device to communicate the captured audio data; and determining the first client computing device is authorized to communicate the captured audio data to the external entity in response to determining the one or more characteristics associated with the captured audio data match at least the threshold amount of characteristics specified by the privacy setting.

12. The method of claim 7, wherein determining whether the first client computing device is authorized to communicate the captured audio data to the external entity based at least in part on the privacy setting comprises:

retrieving one or more characteristics associated with the captured audio data;

determining whether the one or more characteristics associated with the captured audio data match at least a threshold amount of characteristics specified by the privacy setting, the at least the threshold amount of characteristics being used to not authorize the first client computing device to communicate the captured audio data; and determining the first client computing device is authorized to communicate the captured audio data to the external entity in response to determining the one or more characteristics associated with the captured audio data do not match at least the threshold amount of characteristics specified by the privacy setting.

13. The method of claim 7, further comprising:

receiving, by the first client computing device, contextual information from the external entity based on the captured audio data if the first client computing device communicates the captured audio data based on the privacy setting.

14. A computer program product comprising a non-transitory computer readable storage medium having instructions encoded thereon that, when executed by a processor of a first client computing device, cause the processor of the first client computing device to:

receive a privacy setting from a user associated with the first client computing device, the privacy setting regulating communication of audio data captured by the first client computing device to one or more external entities;

store the privacy setting in the first client computing device;

capture audio data including voice data from the user being transmitted to a second client computing device;

retrieve the privacy setting;

determine whether the first client computing device is authorized to communicate the captured audio data to an external entity based at least in part on the privacy setting;

not communicating the captured audio data to the external entity when the privacy setting indicates that communication to the external entity is not authorized; and communicating the captured audio data to the external entity when the privacy setting indicates that communication to the external entity is authorized.

15. The computer program product of claim 14, wherein determine whether the first client computing device is authorized to communicate the captured audio data to the external entity based at least in part on the privacy setting comprises:

determine whether the privacy setting has a privacy setting value authorizing communication of the captured audio data or has a privacy setting value preventing communication of the captured audio data.

16. The computer program product of claim 14, wherein determine whether the first client computing device is authorized to communicate the captured audio data to the external entity based at least in part on the privacy setting comprises:

compare an identifier associated with the external entity to an identifier specified by the privacy setting, the identifier indicating an entity to which the first client computing device is authorized to communicate the captured audio data; and determine the first client computing device is authorized to communicate the captured audio data to the external entity if the identifier associated with the external entity matches the identifier specified by the privacy setting.

17. The computer program product of claim 14, wherein determine whether the first client computing device is authorized to communicate the captured audio data to the external entity based at least in part on the privacy setting comprises:
retrieve one or more characteristics associated with the captured audio data;
determine whether the one or more characteristics associated with the captured audio data match at least a threshold amount of characteristics specified by the privacy setting, the at least the threshold amount of characteristics being used to authorize the first client computing device to communicate the captured audio data; and
determine the first client computing device is authorized to communicate the captured audio data to the external entity in response to determining the one or more characteristics associated with the captured audio data match at least the threshold amount of characteristics specified by the privacy setting.

18. The computer program product of claim 14, wherein determine whether the first client computing device is authorized to communicate the captured audio data to the external entity based at least in part on the privacy setting comprises:
compare an identifier associated with the external entity to an identifier specified by the privacy setting, the identifier indicating an entity to which the first client computing device is not authorized to communicate the captured audio data; and
determine the first client computing device is authorized to communicate the captured audio data to the external entity if the identifier associated with the external entity does not match the identifier specified by the privacy setting.

19. The computer program product of claim 14, wherein determine whether the first client computing device is authorized to communicate the captured audio data to the external entity based at least in part on the privacy setting comprises:
retrieve one or more characteristics associated with the captured audio data;
determine whether the one or more characteristics associated with the captured audio data match at least a threshold amount of characteristics specified by the privacy setting, the at least the threshold amount of characteristics being used to not authorize the first client computing device to communicate the captured audio data; and
determine the first client computing device is authorized to communicate the captured audio data to the external entity in response to determining the one or more characteristics associated with the captured audio data do not match at least the threshold amount of characteristics specified by the privacy setting.

* * * * *